United States Patent [19]

Ross et al.

[11] Patent Number: 5,433,422

[45] Date of Patent: * Jul. 18, 1995

[54] ACTIVE VIBRATION CONTROL THROUGH SENSING AND CONTROLLING FORCES ON AN INTERMEDIATE BODY

[76] Inventors: Colin F. Ross, 46 Church Road, Fen Ditton, Cambridge CB5 8SU; Julian F. Scott, 5 York Terrace, Cambridge CB1 2PR; George C. Sutcliffe, 235 Mill Road, Cambridge CB1 3BE, all of United Kingdom

[*] Notice: The portion of the term of this patent subsequent to Nov. 18, 2010 has been disclaimed.

[21] Appl. No.: 356,414

[22] Filed: May 25, 1989

Related U.S. Application Data

[63] Continuation-in-part of Ser. No. 252,365, Sep. 2, 1988, abandoned.

[51] Int. Cl.⁶ ............................................. F16F 7/10
[52] U.S. Cl. ............................ 267/140.15; 267/141.1; 188/379
[58] Field of Search ............................ 188/378–380; 248/550, 559, 562, 636, 638; 180/300, 312, 902; 267/140.1, 219, 136, 140.1–140.14, 140.15, 141.1

[56] References Cited

U.S. PATENT DOCUMENTS

| | | | |
|---|---|---|---|
| 3,703,999 | 11/1972 | Forys et al. | 188/380 X |
| 4,436,188 | 3/1984 | Jones | 188/378 |
| 4,610,420 | 9/1986 | Fukushima et al. | 180/300 X |
| 4,637,584 | 1/1987 | Takehara | 248/559 |
| 4,796,873 | 1/1989 | Schubert | 267/136 |
| 4,926,985 | 5/1990 | Mizuno et al. | 267/136 X |

FOREIGN PATENT DOCUMENTS

| | | | |
|---|---|---|---|
| 1547529 | 11/1968 | France | 267/136 |
| 2804865 | 8/1978 | Germany | 248/550 |
| 0179543 | 9/1985 | Japan | 267/140.1 |
| 0426084 | 10/1974 | U.S.S.R. | 248/559 |
| WO8805506 | 7/1988 | WIPO . | |

Primary Examiner—Josie A. Ballato
Attorney, Agent, or Firm—Lee, Mann, Smith, McWilliams, Sweeney & Ohlson

[57] ABSTRACT

A method and mounting for active vibration control of a vibrating body mounted to a supporting body, or vice versa, via a mounting which includes an intermediate body, wherein the intermediate body is substantially passively decoupled from the vibrating body and the supporting body, at least over part of the frequency range over which vibrations are to be controlled, and over said at least part of the vibration frequency range compensating forces are applied to the intermediate body in response to vibrations detected within it.

17 Claims, 6 Drawing Sheets

ACTIVE VIBRATION CONTROL THROUGH SENSING AND CONTROLLING FORCES ON AN INTERMEDIATE BODY

RELATED APPLICATIONS

This application is a continuation-in-part of our application Ser. No. 07/252,365 filed 2nd Sep., 1988, now abandoned.

FIELD OF THE INVENTION

The present invention relates to the active control of vibration.

BACKGROUND OF THE INVENTION

When a vibrating body is mounted on a support body, it is often desired to minimise or eliminate the transmission of vibration from the vibrating body to the support body. It is known to reduce the transmission of vibration passively by providing vibration isolators of various forms between the two bodies. It is also known to reduce vibration actively, often in conjunction with the use of passive isolators. In the active control of vibration, sensors are attached to a body to measure its movements and these measurements are used to generate control signals for one or more devices for applying cancelling forces or movements to the body. It is known to provide this active control system on the vibrating body itself or on the supporting body.

In theory, the active control of vibration can be absolutely effective and reduce all vibrations to zero. However, this would require the provision of exactly the correct cancelling forces at exactly the correct timing. In practice, this is difficult if not impossible to achieve. Normally, both the vibrating body and the support will have a complex distribution of mass and rigidity and the vibrations to be cancelled will also be relatively complex. Accordingly, the calculation of the correct pattern of forces to be applied is complicated. Additionally, the calculation takes a certain amount of time. Accordingly, the cancelling forces actually applied will be only an approximation to the exact cancelling forces required and the timing of application of the forces may not be correct. Any attempt to increase the accuracy of the calculation will increase the time taken and any attempt to decrease the time taken will decrease the accuracy.

The problems are compounded in the common situation in which a vibrating body is mounted at several separate points on a supporting body. Active cancellation must be applied at each mount, thus each mount will tend to have several vibration sensors and several actuators to apply cancelling forces in different directions. If there are N mounts, each having M actuators and K sensors, then the control system must attempt to minimise the vibrations detected at KN sensors by the operation of MN actuators. However, since all the sensors and all the actuators are mounted on the same body (the vibrating body or the support body), the forces applied by each actuator will have an effect on the movements detected by each sensor, through the common body. Thus the control system must operate on an MN×KN matrix of interactions between actuators and sensors. Following calculation of this matrix, the control system must calculate MN control signals for the forces to be applied by each individual actuator in order to cancel the vibrations.

In the passive control of vibration, isolating arrangements are well known which include an intermediate body between the vibrating body and the supporting body. Such isolating arrangements comprise compound mounts designed so that the secondary mounting resonance is below the frequency at which vibration isolation is required. This means that, for effective vibration isolation at low frequencies, the intermediate body must be of relatively large mass.

SUMMARY OF THE INVENTION

The present invention provides a method of active vibration control in which a vibrating body is mounted on a supporting body by a mount which includes a rigid intermediate body between the vibrating body and the supporting body and substantially passively decoupled from both of them, and in which the vibrations in the intermediate body, at least over a part of the frequency range for which vibration control is required, are minimised by the application of compensating forces to it in response to detected vibrations ideally of the intermediate body, though could be of the support body or of the vibrating body.

The present invention also provides a mounting by which a vibrating body may be mounted on a supporting body, comprising a rigid intermediate body, means to mount the vibrating body on one side of the intermediate body and decoupled therefrom, means to mount the supporting body on the other side of the intermediate body and decoupled therefrom, and vibration reducing means to apply forces to the intermediate body to minimise detected vibrations in it, at least over a part of the frequency range for which vibration control is required. Generally active vibration reducing means will be provided.

In the following description, where reference is made to cancellation of vibrations in the intermediate body, this refers to the part of the frequency range over which vibration control is required if active control is not provided over the entire range. Generally, when active control is provided for part of the frequency range only, this active control will provide low frequency isolation.

If vibrations in the intermediate body can be cancelled, it will not transmit any vibrations to the supporting body, and thus the arrangement will minimise the transmission of vibrations to the supporting body. Since the intermediate body is substantially decoupled from both the vibrating body and the supporting body, it may not be necessary to take the pattern of rigidity and mass distribution in either the vibrating body or the supporting body into account when calculating the compensating forces to be applied to the intermediate body. Since in the case of active vibration control over the entire range of interest, the intermediate body is provided simply in order to have its vibrations cancelled, its pattern of rigidity and mass distribution may be selected to reduce the complexity of the calculations necessary. When active control is provided only for low vibration frequencies, the intermediate body is required to provide mass for passive control at higher frequencies only, the intermediate body can be of smaller mass than would otherwise be the case.

In the case referred to above where the vibrating body is mounted on the supporting body in a number of places, each mount may have a substantially decoupled intermediate body and because they are substantially decoupled the cross-interactions are small and so they may each be considered in isolation from each other without much error. Accordingly, instead of one matrix of interaction of size MN×KN, there are N individual matrices, one for each mount, each of size M×K. Thus the total amount of calculation required to generate estimates of the interaction matrices is reduced, and additionally a separate controller may be provided for each mount so that calculation of the N separate matrices may occur in parallel. Each of these factors has an N-fold reduction in the amount of calculation required, so that the amount of time taken to estimate the interaction matrices may be reduced by a factor of $N^2$. The subsequent calculation of control signals required for the actuators will still involve MN actuators, but the control signals for each separate group of M actuators at each mount may be calculated independently and in parallel, so that there is an N-fold reduction in calculation time at this step.

Since, except when passive control utilising secondary mounting resonance is utilised for cancellation over part of the frequency range of interest, the intermediate body is substantially decoupled from the other bodies, a further advantage of this arrangement is that the characteristics of the vibrating body and the supporting body will have little effect upon the calculations, that a system can be optimised ignoring their effect, and so once the characteristic calculations required for a mount have been determined it may be used to mount any vibrating body on any supporting body without the need for any alterations in its control system and will operate fairly well in most environments. Even when active control is only employed for low frequency vibrations, a less complex control system will usually be possible.

Again since there is substantial decoupling another important benefit is that the calculation of the control signals at each mount is independent of the presence of the other mounts. Accordingly, increasing the number of mounts for a vibrating body does not increase the time required to calculate the control signals for the actuators, assuming that each mount is provided with an individual control system which operates independently and in parallel to all the others.

In some circumstances, it may be advantageous to provide the mounting with a passive damper, to reduce oscillations within the mounting which might otherwise be perpetuated by the resilience of the decoupling between the intermediate member and the vibrating and supporting bodies.

It may also be desirable to have more than one mount connecting the intermediate body to the vibrating or support body.

In another embodiment of the invention the support body is vibrating and the body being supported is to be isolated i.e. kept free from vibration.

If the intermediate body were rigid then because it has only six degrees of freedom itself it would be necessary to provide at least six movement sensors in order to prescribe its vibration completely. If the intermediate body was sufficiently large compared with the structural wavelengths or if significant bending moments were applied to the body so that it no longer remained rigid, then a minimum of more than six movement sensors will be required to prescribe its vibration. All of the movement sensors which give significant information about the intermediate body's movement would be used by the control system.

In addition, if the body remains rigid then six forces will be sufficient to provide the control necessary to reduce the vibration of the body provided that they are able independently to drive the six degrees of freedom of the body. If the body is not rigid then more forces and thus actuators may be necessary. For a thorough cancellation of forces within the intermediate body, the compensating forces should be applied along the same lines as those corresponding to the effective forces applied to the intermediate body by the vibrating body and in the opposite direction. However, it is desirable to minimise the number of actuators required to control the intermediate body's vibration and in a preferred embodiment of the invention the mounting is such that all forces applied to the intermediate body by the vibrating body can be reduced mechanically to forces applied at a single point. In this case a reduced number of actuators will be required, three being sufficient to provide a general compensating force acting through a single point. This simplification will generally not be possible if active control is employed only for low frequency vibrations. However, even in this case, no more than six actuators will be required to control the intermediate body.

In some systems the forces from the vibrating body acting upon the intermediate body tend to be confined to a single plane, in which case the actuators of the active vibration reduction system may only be required to generate forces in the two dimensions within the plane and rotational movement about an axis normal to the plane.

Since the static requirement for mounts is generally to provide a force in one direction to support the body it is required to be relatively stiff in that direction. However, it will transmit vibration in all axes in which it is stiff and thus it is advantageous to reduce the stiffness of the passive mount components in the other aces or at least to reduce the stiffness of the decoupling means on the vibrating body side of the intermediate body. The mount would then only transmit vibrational forces in one direction and only one actuator and sensor would be required.

Furthermore this single actuator need not apply forces to a body at all; the actuator could be the body itself provided that it was substantially decoupled from the vibrating and support bodies.

Normally, the sensors will be accelerometers and the actuators will be shakers mounted on the intermediate body.

An embodiment of the present invention, given by way of non-limitative example, will now be described with reference to the accompanying drawings, in which:

FIG. 7b is a cross-sectional view taken along lines 7b—7b of FIG. 7a.

DETAILED DESCRIPTION OF THE DRAWINGS

Figure 1:
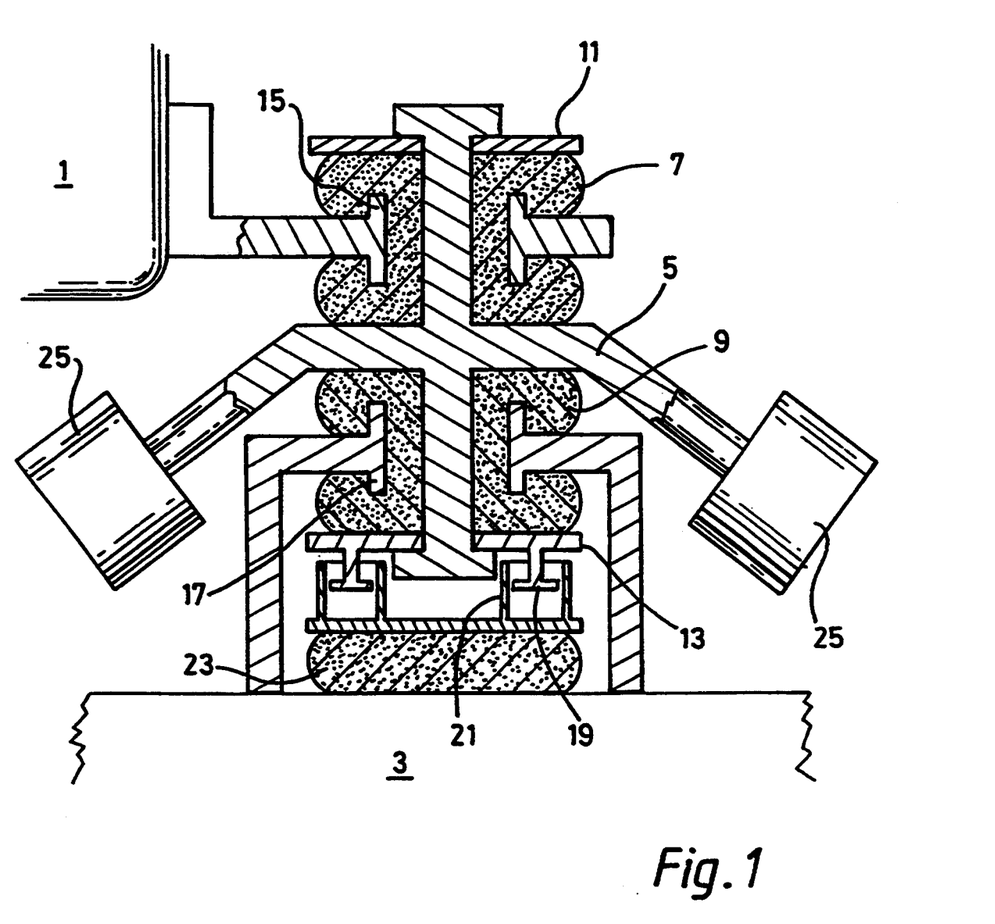
FIG. 1 is a side view of a mounting embodying the present invention, largely in section.

FIG. 1 shows a mounting by which a vibrating body 1 is mounted on a supporting body 3. The mounting includes an intermediate body 5 and two elastomeric members 7, 9 one each above and below it. The elastomeric members are held in place by washers 11, 13 which are themselves trapped by flanges of the intermediate body 5.

The vibrating body 1 is supported on the mounting by an attachment ring 15 which is positioned within the upper elastomeric body 7 and extending around but spaced from the intermediate body 5. The supporting body is joined to the mounting by a similar attachment ring 17, which also passes around the intermediate body and is positioned within the lower elastomeric body 9.

The weight of the vibrating body 1 is transmitted through the upper elastomeric member 7, a central portion of the intermediate body 5, and the lower elastomeric member 9 to the supporting body 3. The elastomeric members 7, 9 will also tend to transmit vibration between the bodies, but their resilience means that vibrational movement of the intermediate body and forces within it are decoupled from the vibrating body 1 and the supporting body 3.

Because the only supports for the intermediate body 5 are resilient, it may tend to oscillate. In order to damp such oscillations, the lower washer 13 bears damper plates 19 which are positioned within dashpots 21 mounted through a further elastomeric member 23 on the supporting 3. This arrangement damps vertical oscillations of the lower washer 13, and through it the intermediate body 5, in a manner known per se.

Figure 2:
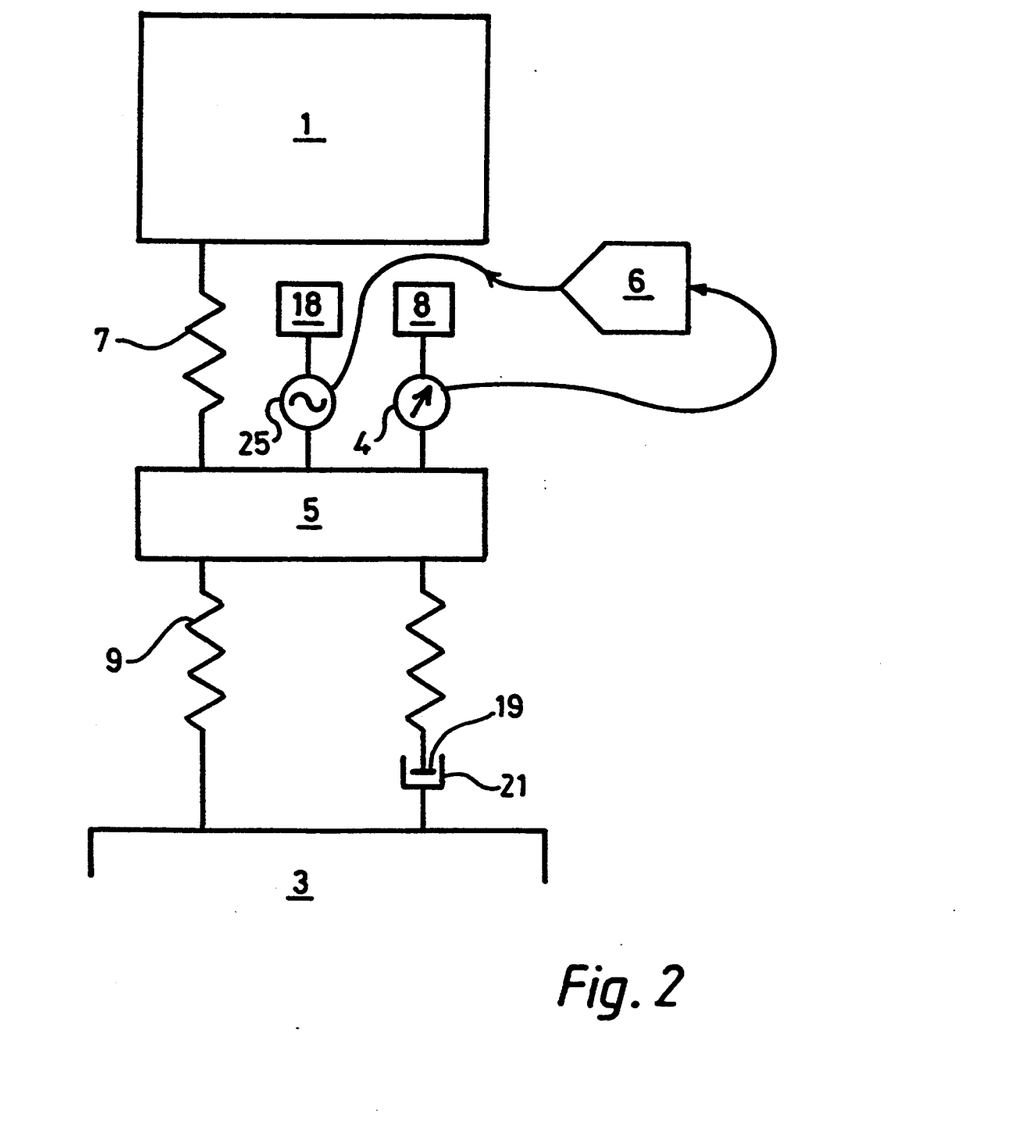
FIG. 2 is a diagram of a mechanical equivalent system to the mounting of FIG. 1.

FIG. 2 shows the mechanical and electrical equivalent of the system illustrated in FIG. 1, in terms of masses, springs, a damper, a force-source and a force-detector. Corresponding parts are given the same reference numerals as in FIG. 1.

The vibrations of the vibrating body 1 cause forces to be transmitted through the upper elastomeric decoupling member 7 to the intermediate body 5, which tends to be vibrated. In order to eliminate or minimise the vibration in the intermediate body 5, it is equipped with a system 4, 6, 18, 25 for the active control of vibration. It will be appreciated that if vibration is eliminated in the intermediate body 5, it will not transmit vibration through the lower elastomeric decoupling member 9 to the support body 3.

The active vibration control system includes a number of accelerometers 4 mounted on the intermediate body 5 to measure its translational and rotational movement in various directions and about various axes, a plurality of shakers 25, and associated respective reaction masses 18, likewise mounted on the intermediate body 5 and operable to transmit forces to it, each along a particular line or about a particular axis, and a control means 6. Such control systems are known per se, but have hitherto only been mounted on vibrating bodies and support bodies rather than on intermediate bodies. The control means receives signals from the accelerometers 4, and in turn derives control signals for the shakers 25, so as to control the operation of the shakers 25 in such a manner as to counteract the vibrating forces received from the vibrating body 1 and render the intermediate body 5 motionless. Thus the control means 6 is in effect a negative feedback system operating to maintain the outputs of the accelerometers as nearly as possible at zero detected acceleration.

In FIG. 2 only one accelerometer 4 and one shaker 25 are illustrated, but in general a plurality of accelerometers may provide signals to the control means 6 which may then provide signals to a plurality of shakers 25 in order to counteract vibrations of the intermediate body 5.

Figure 3:
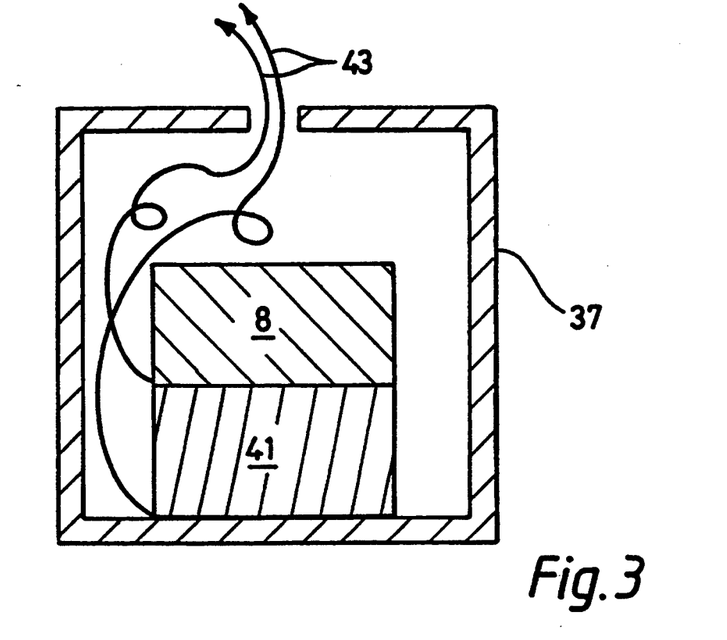
FIG. 3 shows a force sensor.

The accelerometer 4 shown in FIG. 2 may operate, for example, by measuring the force of reaction produced between the intermediate body 5 and an inertial mass 8 (if it operates otherwise then the mass 8 may be omitted). The body 5 and the mass 8 are connected by a stiff material which communicates the vibrations of the body 5 to the mass 8 and produces a signal proportional to the inertial force of reaction exerted upon it by the mass 8 as a result of the vibrations. A schematic section through a plan of a suitable device appears in FIG. 3. Typically the device will have cylindrical symmetry about its vertical axis. A rigid outer casing 37 typically made of steel has a slab of piezoelectric material 41 rigidly attached at its base. A suitable piezoelectric material 41 is lead zirconate titanate (PZT) ceramic. The material 41 has its upper and lower faces coated with electrically conductive material to form electrodes to which wires 43 are attached, and has its piezoelectric axis orientated so that a compressive force applied to its upper and lower faces will tend to produce an electric potential difference between the electrodes on those faces. The rigid inertial mass 8, typically made of metal, is rigidly attached to the upper face of the piezoelectric slab 41. When the casing 37 is subjected to a vertical acceleration by the action of an external force, the force of inertial reaction exerted on the slab 41 by the mass 8 tends to produce an electric potential difference between the wires 43. This potential difference is substantially proportional to the vertical acceleration of the case 37. The device is thus adapted to measure accelerations of the body 5 in FIG. 2 by rigidly attaching the case 37 to the body 5. Such devices are well known, and may commercial types may be purchased, for example from Endevco Corp. of San Juan Capistrano, Calif.

Figure 4:
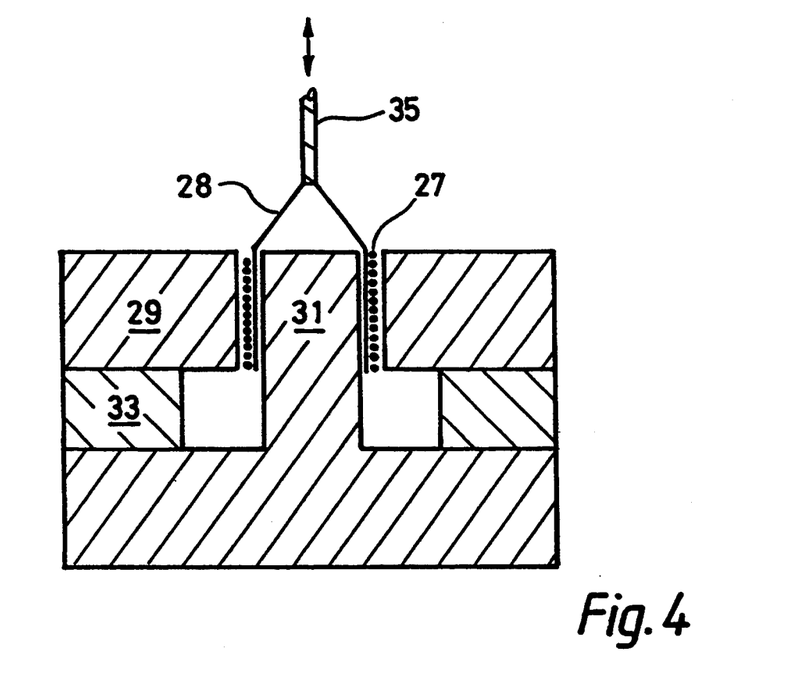
FIG. 4 shows an electromagnetic force-producing means.

FIG. 4 is a schematic cross-section through a plan of a suitable force-producing means corresponding to the shaker 25 and its inertial reaction mass 18 shown in FIG. 2. Again the device typically has cylindrical symmetry about its vertical axis. It consists of a permanent magnet 33 in the shape of an annular ring to which are attached soft iron pole pieces 29 and 31. The magnet is polarised so that the pole piece 29 acts as a magnetic north pole and the pole piece 31 acts as a magnetic south pole, or vice-versa. This arrangement produces a substantially radial and horizontal magnetic field in the narrow air gap between the poles 29 and 31. A coil of wire 27 wound on a substantially rigid hollow former 28 made of non-magnetic material is suspended in this gap by a compliant suspension system which typically consists of springs made from non-ferrous metal. The suspension system is anchored to the pole piece 29. Electrical connections are made to the coil 27 by flexible wires. When an electric current is passed through the coil 27, the action of the magnetic field between the poles 29 and 31 produces a force in the vertical direction on the coil 27. This force is transmitted via the former 28 to a spindle 35, which is used to make mechanical connection to the intermediate body 5 of FIG. 2 and thus transmit the force to the body 5. Typically the combined mass of the magnet 33 and the pole pieces 29 and 31 are sufficient to supply the function of the reaction mass 18 shown in FIG. 2. If, however, additional reaction mass is required, then an additional mass may be attached to the base of the pole piece 31. Devices of this type are well known and are commonly referred to as "electromagnetic shakers". Various commercial types may be purchased, for example from Ling Dynamic Systems Inc. of Yalesville, Conn.

Because the contact between the vibrating body 1 and the mounting is solely by means of the attachment ring 15 and a circular flange around it, the contact is symmetrical. Accordingly, it is possible to treat all the forces applied by the vibrating body 1 to the intermediate body 5 as being applied at the point at the centre of the attachment ring 15. Each shaker 25 is arranged to provide a force along a line or about an axis which also passes through this same spot. This can be seen clearly in respect of the two shakers illustrated in FIG. 1.

In this manner, the vibrating forces from the vibrating body 1 and the compensating forces from the shakers 25 can be considered to the applied to the intermediate body 5 at the same point. This avoids any turning moments being generated within the intermediate body 5 by lateral offsets between opposing forces.

The shakers 25 are arranged symmetrically around the intermediate body 5, and are preferably spaced by 90° or 120°. This provides a simple and symmetrical distribution of masses and of compensating forces within the intermediate body 5.

Because the intermediate body 5 is decoupled from the vibrating body 1 and the supporting body 3, and is designed to have a simple shape, the calculations required to derive the necessary control signals for the shakers 25 are greatly simplified as compared with the known arrangements of mounting an active vibration control system on either a vibrating body or a supporting body, in which case the characteristics of that body must be taken into consideration. In the example above-described, it is assumed that active control of the intermediate body is prevailed over the entire frequency range of vibrations for which isolation is required. In a modification, active control is used to eliminate low frequency vibrations of the intermediate body, which in conjunction with other parts of the mounting through which the vibrating body is connected to the supporting body, is designed to achieve passive control of higher frequency vibrations in a substantially conventional manner. Six accelerometers will generally be required for the active vibration control system, but the intermediate body can be of smaller mass than in mountings relying solely on passive control.

Figure 5:
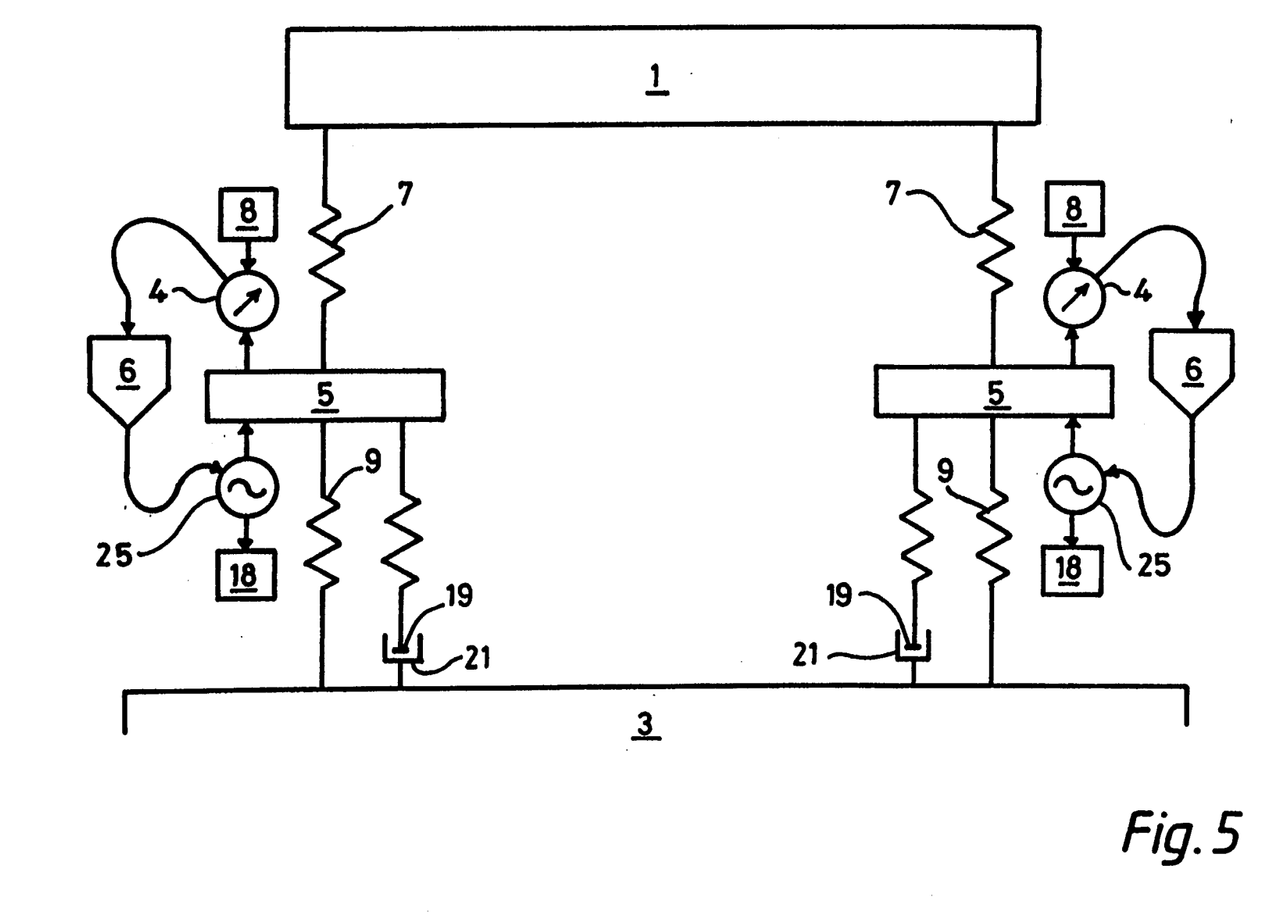
FIG. 5 shows a mounting arrangement incorporating a plurality of individual mounts.

FIG. 5 shows the mechanical and electrical equivalent of a system in which the vibrating body 1 is supported on more than one of the mounts illustrated in FIGS. 1 and 2, in this case on two such mounts. Each mount has its own intermediate body 5, its own elastomeric members 7 and 9 and its own active control means 4, 6, 8, 18, 25 and indeed the individual mounts may be effectively identical. The vibrational body 1 is shown here supported on two such mount assemblies but this number may be extended as required in the obvious manner.

Figure 6:
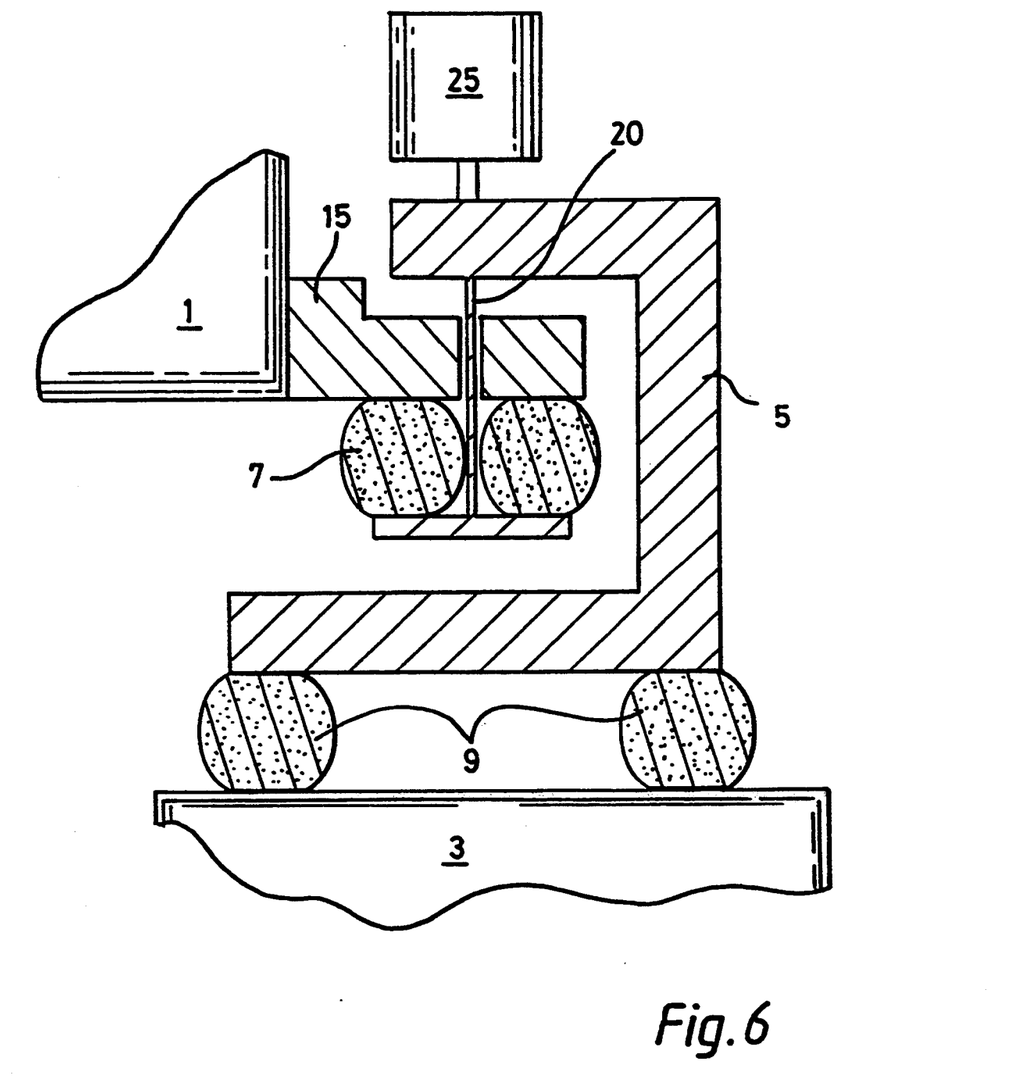
FIG. 6 shows a modification of the arrangement of FIG. 1.

FIG. 6 shows an arrangement similar to FIG. 1 but with a single force producing means 25 acting on the intermediate body 5. This arrangement is useful when it is only required to isolate motions of the vibrating body 1 in a single direction. In this example, the mounting flange 15 on the body 1 communicates mechanically with the intermediate body 5 via a vertical thin neck or wire 20 which is significantly stiff in response to vertical vibrations but is substantially compliant in response to all other vibrations. Thus only vertical vibrations are thus significantly communicated to the intermediate body 5. Such vibrations may be detected by an accelerometer attached to the intermediate body 5, and active control means may use the signal from the accelerometer to determine a control signal to the force-producing means 25, which is disposed so as to be able to apply opposing vertical vibrating forces to the intermediate body 5.

Figure 7A:
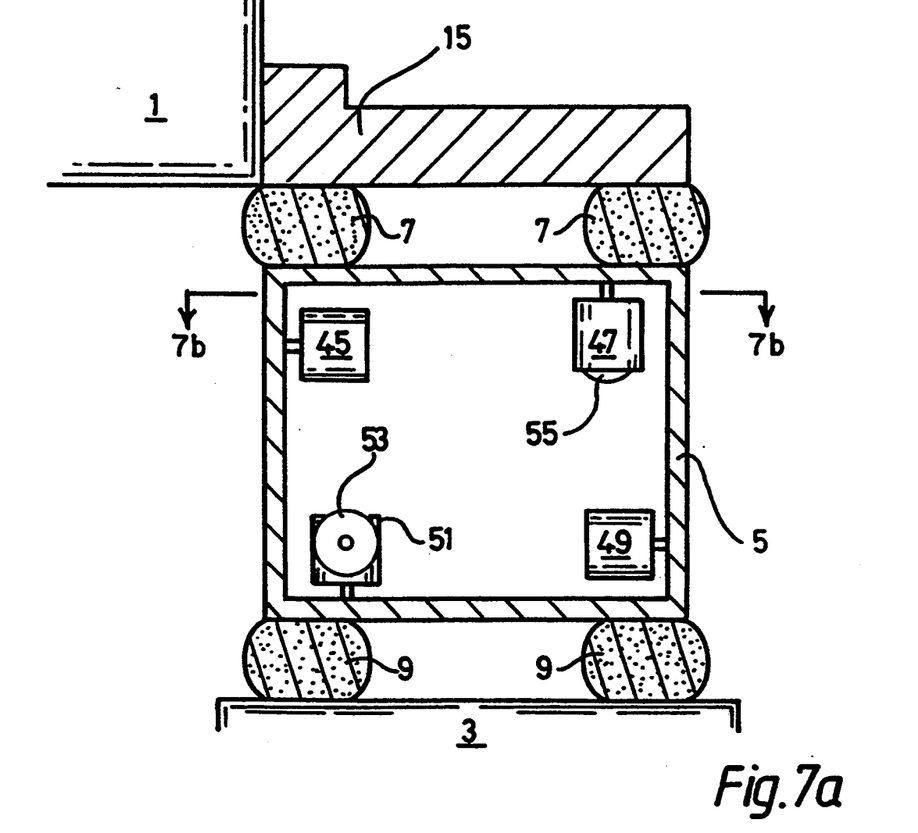
FIG. 7a shows a mounting with a universal vibration control.
Figure 7B:
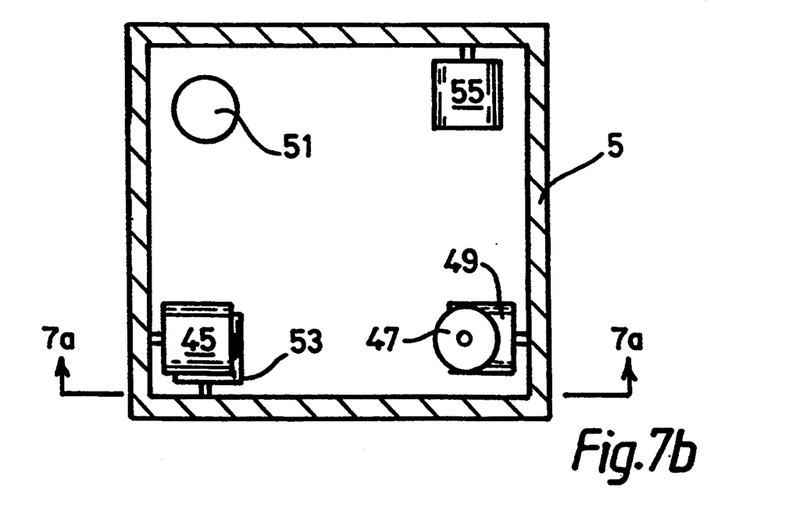

FIGS. 7a and 7b show a mount in accordance with the invention in which six forces producing means 45, 47, 49, 51, 53, 55 are attached to the intermediate body 5 so as to allow control over any type of rigid body motion of the intermediate body 5. FIG. 7a is a section through an elevation and FIG. 7b is a section through a plan. FIG. 7a is a section through line 7a on FIG. 7b or FIG. 7b is a section through line 7b in FIG. 7a. In this example, the intermediate body 5 is to be substantially rigid at all frequencies at which control is desired, so that six force producing means, 45, 47, 49, 51, 53, 55 are also sufficient to allow control of all vibration to the support body 3. In this example the intermediate body 5 has the form of a hollow rectangular box with the force producing means 45, 47, 49, 51, 53, 55 fixed to its interior. One or more of its walls may be partially cut away to allow access to the interior, but the cutaways should not render the intermediate body 5 significantly non-rigid at any frequency at which control is desired.

We claim:

1. A method of active vibration control including the steps of mounting a subject body on a supporting body by a mount which includes an intermediate body between the subject body and the supporting body, weakly vibrationally coupling the intermediate body to both of the said subject and supporting bodies, and, at least over a part of the frequency range for which control of vibrations is required, minimising vibrations of the intermediate body by the application of controlling forces to it, said forces being responsive to a single obtained by directly sensing vibrations of the intermediate body.

2. A method according to claim 1 wherein the subject body is mounted on the supporting body at a number of mounting points.

3. A method according to claim 2, including providing a separate active vibration means for controlling vibrations for each mounting point.

4. A method according to claim 3, wherein each mounting point has M force producing means for producing said controlling forces, and including the step of calculating independently control signals for the M force producing means at each mounting point.

5. A method according to claim 1, including the step of providing damping means associated with the intermediate body mount in order to reduce oscillations within the mount which might otherwise be perpetuated by the resilience of the decoupling between the intermediate body and the subject and supporting bodies.

6. A method according to claim 1, including providing more than one resilient element connecting the intermediate body to at least one of the subject body and support body.

7. A method according to claim 1, in which the intermediate body is rigid.

8. A method according to claim 7 in which the intermediate body possesses n degrees of freedom and including the step of supplying up to n said controlling forces to the intermediate body to completely control the vibration.

9. A method according to claim 1, including the step of confining the forces from the subject body acting upon the intermediate body substantially to a single plane, and providing actuators consisting of two force producing means to generate forces in two othogonal directions within the plane and rotational movement about an axis normal to the plane.

10. A method according to claim 1, wherein the mount is relatively stiff in one direction and thus provides a supporting force substantially in that direction, whilst having lesser stiffness of passive mount components in the other perpendicular directions, or at least reduced stiffness of a decoupling means on the subject body side of the intermediate body, and with said controlling forces provided by only one actuator.

11. A method according to claim 10, wherein part of the single actuator constitutes the intermediate body.

12. A method according to claim 1, wherein the vibration sensing is by means of at least one accelerometer.

13. A method according to claim 1, wherein said controlling forces are provided by at least one inertial shaker.

14. A method according to claim 1, including the step of using active control means to control vibrations over the low frequency part of the range of vibrations and using passive control means for higher vibration frequencies.

15. A mounting for carrying out the method of claim 1, in which the subject body is mounted on the supporting body by the mount which includes the intermediate body between the subject body and the supporting body wherein the intermediate body is weakly vibrationally coupled to both of said subject and supporting bodies, and in which means is provided for applying a compensating force to the intermediate body, so as to minimize the vibrations of the intermediate body over a part of the frequency range for which control of vibrations is required.

16. A mounting as claimed in claim 15, in which the intermediate body is rigid.

17. A mounting according to claim 15, in which the compensating force means is an active vibration controller means.

* * * * *